(12) United States Patent
Doy et al.

(10) Patent No.: US 12,528,408 B2
(45) Date of Patent: Jan. 20, 2026

(54) ASPHALT COMPACTOR PROPEL DIRECTION INDICATION

(71) Applicant: Caterpillar Paving Products Inc., Brooklyn Park, MN (US)

(72) Inventors: Nathaniel S. Doy, Maple Grove, MN (US); Timothy J. Lindholm, Blaine, MN (US); Jeremy W. Lee, Otsego, MN (US); Nicholas A. Oetken, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 900 days.

(21) Appl. No.: 17/696,092

(22) Filed: Mar. 16, 2022

(65) Prior Publication Data
US 2023/0294602 A1    Sep. 21, 2023

(51) Int. Cl.
| | |
|---|---|
| *B60Q 9/00* | (2006.01) |
| *B60K 35/80* | (2024.01) |
| *E01C 19/26* | (2006.01) |
| *B60K 35/22* | (2024.01) |
| *B60K 35/28* | (2024.01) |

(52) U.S. Cl.
CPC ............... *B60Q 9/00* (2013.01); *B60K 35/80* (2024.01); *E01C 19/26* (2013.01); *B60K 35/22* (2024.01); *B60K 35/28* (2024.01); *B60K 2360/166* (2024.01)

(58) Field of Classification Search
CPC ............ E01C 19/22; E01C 19/26; B60Q 9/00
See application file for complete search history.

(56) References Cited

U.S. PATENT DOCUMENTS

| | | | |
|---|---|---|---|
| 3,357,513 A | 12/1967 | Olof | |
| 3,868,194 A * | 2/1975 | Ferguson | E01C 19/26 180/323 |
| 5,664,909 A * | 9/1997 | Lindgren | E01C 19/26 180/326 |
| 7,441,625 B2 * | 10/2008 | Ackermann | B62D 1/12 180/326 |
| 8,954,240 B2 | 2/2015 | Scully | |
| 9,777,443 B2 | 10/2017 | Bornemann et al. | |
| 10,632,867 B2 | 4/2020 | Kim et al. | |
| 10,843,670 B2 | 11/2020 | Petersen et al. | |
| 11,613,180 B2 * | 3/2023 | Hedrington | G05G 9/047 180/329 |
| 12,275,347 B1 * | 4/2025 | Stieber | B60Q 1/507 |
| 2018/0251955 A1 * | 9/2018 | Wynkoop | E02F 9/2025 |
| 2025/0242751 A1 * | 7/2025 | Stieber | B60W 60/005 |

FOREIGN PATENT DOCUMENTS

| | | | | |
|---|---|---|---|---|
| DE | 102013209820 A1 * | 11/2014 | ............ | B60W 10/04 |
| WO | WO-2004059088 A1 * | 7/2004 | ............... | B60N 2/14 |

* cited by examiner

*Primary Examiner* — Gary S Hartmann

(57) ABSTRACT

A compactor can include a frame; one or more drums coupled to the frame; an operator's seat rotatable relative to the compactor machine; and an indicator to indicate to the operator a direction of propulsion of the compactor machine before the compactor machine begins moving.

18 Claims, 3 Drawing Sheets

ASPHALT COMPACTOR PROPEL DIRECTION INDICATION

TECHNICAL FIELD

This disclosure relates to road construction equipment, and more specifically to a compactor machine.

BACKGROUND

Compactors are machines used to compact initially loose materials, such as asphalt, soil, gravel, and the like, to a densified and more rigid mass or surface. Compactors can include rotatable roller drums that may be rolled over the surface to compress the material underneath.

The compactors can provide rotating operator seats and the machines are generally symmetrical front and rear. The controls are mirrored (reversed) as the seat changes position from facing one direction to facing the other direction. This can lead to confusion about which direction the machine will travel or steer.

U.S. Pat. No. 10,843,670 discusses controlling a work machine based on seat orientation.

SUMMARY

In an example according to this disclosure, a compactor can include a frame; one or more drums coupled to the frame; an operator's seat rotatable relative to the compactor machine; and an indicator to indicate to the operator a direction of propulsion of the compactor machine before the compactor machine begins moving.

In another example according to the present disclosure, a system for operating a compactor machine can include a controller to determine a seat orientation of an operator's seat relative to a front end and a back end of the compactor machine; and an indicator coupled to the controller to indicate to the operator a direction of propulsion of the compactor machine before the compactor machine begins moving.

In another example according to the present disclosure, a method for operating a compactor machine can include determining an orientation of an operator's seat of the compactor machine; and showing an indicator to the operator indicating a direction of propulsion of the compactor machine before the compactor machine begins moving.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
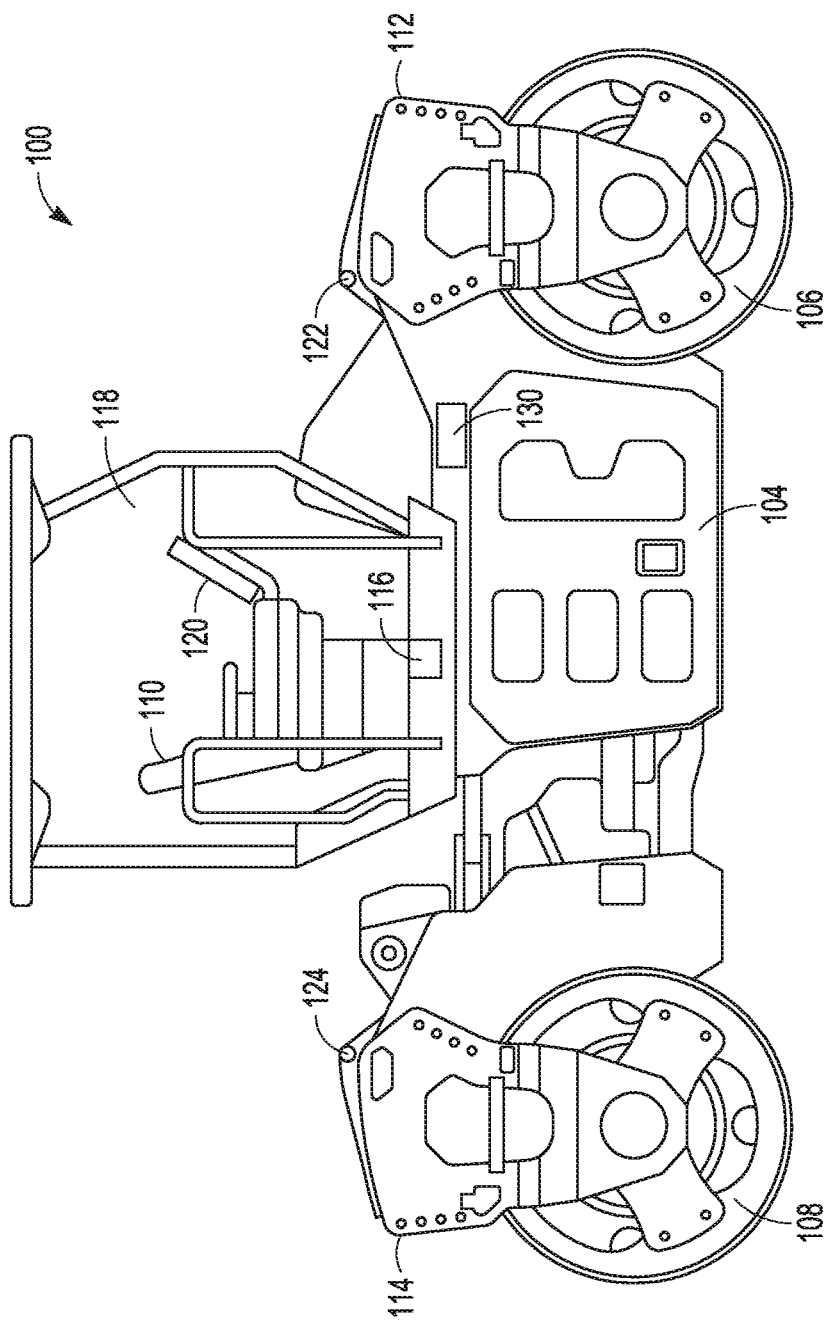
FIG. 1 shows a side view of a compactor machine, in accordance with one embodiment.
Figure 2:
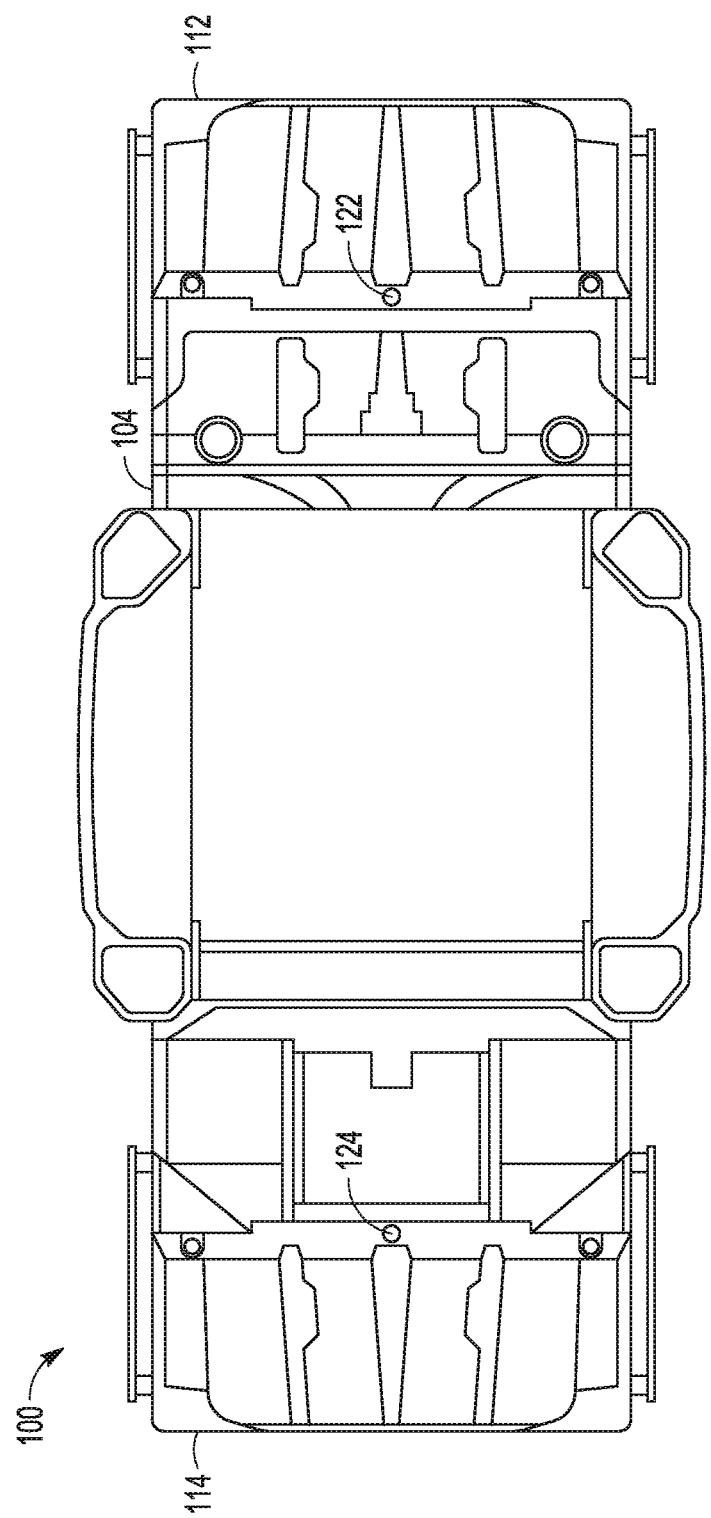
FIG. 2 shows a top view of the compactor machine of FIG. 1, in accordance with one embodiment.

FIG. 1 shows a side view of a compactor machine 100, in accordance with one embodiment, and FIG. 2 shows a top view of the compactor machine 100. The compactor machine 100 can be used, for example, for asphalt compaction, for soil compaction, road construction, highway construction, parking lot construction, and other such paving and/or construction applications. The compactor machine 100 may make one or more passes over a worksite surface to provide a desired level of compaction.

The compactor machine 100 can generally include a frame 104, a first drum 106, and a second drum 108. The first and second drums 106, 108 may comprise substantially cylindrical drums and the first and second drums 106, 108 may be configured to apply vibration and/or other forces to the worksite surface in order to assist in compacting the worksite surface.

The first drum 106 may define a first central axis about which the first drum 106 may rotate, and similarly, the second drum 108 may define a second central axis about which the second drum 108 may rotate. The compactor machine 100 is shown as having first and second drums 106, 108. However, other types of compactor machines 100 may be suitable for use in the context of the present disclosure. For example, pneumatic compaction machines, belted compaction machines or compaction machines having a single rotating drum, or more than two drums, are contemplated herein.

The compactor machine 100 may also include an operator station 118. The operator station 118 may include a steering system including a steering wheel, levers, and/or other controls for steering and/or otherwise operating the compactor machine 100. In such examples, the various components of the steering system may be connected to one or more actuators, a throttle of the compactor machine 100, an engine of the compactor machine 100, a braking assembly, and/or other such compactor machine components, and the steering system may be used by an operator of the compactor machine 100 to adjust a speed, travel direction, and/or other aspects of the compactor machine 100 during use.

The compactor machine 100 can include an operator's seat 110 rotatable to face a front end 112 or a back end 114 of the compactor machine 100. In one embodiment, the seat 110 can be rotatable so as to only turn 90 degrees each way from the front facing direction. As noted, the compactor machine 100 is generally symmetrical from either a front end 112 or a back end 114, and the machine is operable in either direction. Thus, the seat 110 can be rotated in either direction (or 90 degrees sideways) for operation.

In one example, the machine 100 can further include a sensor 116 coupled to the seat 110 to determine an orientation of the seat 110. Thus, the sensor 116 can determine whether the seat is facing forward or facing backward or facing 45 degrees sideways or facing 90 degrees sideways. In some examples, the sensor 116 can be a rotation angle sensor and can determine if the seat 110 is at an angle. The term "sensor" is meant to be used in its broadest sense to include one or more sensors and related components that may be associated with the machine 100 and the seat 110 to determine the seat 110 orientation.

The operator station 118 may also include a display 120 for viewing and controlling various functions of the compactor machine 100. The display 120 includes a viewer screen which is positioned so as to be viewable by the operator when seated in the operator seat 110.

The compactor machine 100 may also include a controller 130 in communication with the steering system, the display 120, the sensor 116 and/or other components of the compactor machine 100. The controller 130 may be a single controller or multiple controllers working together to perform a variety of tasks.

Again, since the compactor machine 100 includes the rotating operator's seat 110, the machine 100 is generally symmetrical machine front and rear, and the controls are mirrored (reversed) as the seat changes position from facing one direction to facing the other direction, this can lead to confusion about which direction the machine 100 will travel or steer when the machine 100 begins moving.

The present system allows for indicating a direction of propulsion/steering of the compactor machine 100. In one embodiment, the system can be configured to check the operator seat 110 position. Based on the seat position, the system indicates the direction of machine propulsion/steering via a visual indicator. Thus, the present system can indicate a direction of propulsion/steering of the compactor machine based on an operator seat position before the compactor machine begins moving.

For example, the indicator can include a first light 122 and a second light 124 attached to the front end 112 and the back end 114 of the compactor machine 100, respectively. The first light 122 and the second light 124 can illuminate to indicate the direction of propulsion of the compactor machine 100 before it begins moving. For example, the lights 122, 124 can illuminate or can blink, or a first color light can indicate that is the direction of propulsion and a second color light indicates the opposite direction from the direction of propulsion. For example, the first color light can be green and the second color light can be red. In one example, if one of the lights 122, 124 illuminates, the operator determines that is the direction of propulsion. If one of the lights 122, 124 is not illuminated it indicates the direction opposite the direction of propulsion.

The lights 122, 124 can be used as indicators in various manners. For example, in one embodiment, both the lights 122, 124 can be on at all times. For example, one light can be lit green (or another color) and the other light can be red (or another color). The light colors would switch based on seat direction. In this case, "Green" would tell you the "front" or "forward" direction of the machine 100 and "Red" the "rear" or "reverse" direction. In one embodiment, only one of the lights 122, 124 can be lit at all times to indicate the "front" or "forward" of the machine based on the seat direction.

In one embodiment, the system can wait and only turn on one light 122, 124 at a time when machine is commanded to move. The light that is currently lit can be based on the current propel command direction and this is what the operator checks during a delay period, discussed below.

It is also possible the system can combine different manners of using the indicator lights 122, 124. For example, when the machine is stationary the system can use the lights on at all times method and when the machine moves only leave one light on, or only leave one light on until the machine is moving for a time.

The first light 122 and the second light 124 can be positioned so as to be in the operator's line of sight. So, if the operator thinks they are going to move in a given direction and the operator does not see the proper light 122, 124, they know they are wrong and can adjust accordingly. Moreover, if the operator gets disoriented, they can move the seat or change propulsion directions, as desired. In a further example, the first light 122 and the second light 124 can be positioned on the machine 100 such that a bystander can also see the lights 122, 124 and realize which direction the machine 100 is going to be moving in.

In one example, the compactor machine 100 can further include a delay start, as controlled by the controller 130. Thus, before the compactor machine 100 begins moving, the controller 130 can cause a delay to allow the operator time to check the propulsion direction as indicated by the indicator. For example, the delay start can be about 1-2 seconds. The delay start reminds the operator to check the indicator and allows the operator to determine the machine propel direction and make any changes necessary.

In some examples, the delay start can be performed by the controller 130 on a first propel after the seat 110 changes orientation, or when the operator first sits down in the seat 110, or when the operator buckles a seat belt. Accordingly, on one or more of these occasions, the controller 130 can incorporate the delay start so as to give the operator a reminder and the opportunity to check direction of propulsion. In other examples, the delay start can also be applied at start of propel based on no propel command for some time period. The delay start could also be based on a change in desired propel direction.

Figure 3:
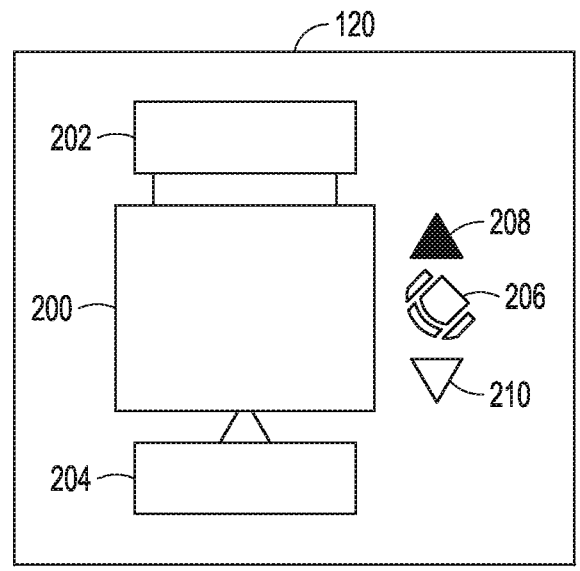
FIG. 3 shows a display, in accordance with one embodiment.

FIG. 3 shows the display 120 of the compactor machine 100, in accordance with one embodiment.

Here, the machine direction indicator can include the display 120 having indicator symbols 208, 210 on the display 120 that indicate to the operator the direction of propulsion of the compactor machine 100 relative to the orientation of the seat. As the seat 110 rotates, the display 120 changes to indicate this. For example, a seat symbol 206 can be shown on the display 120 with a machine symbol 200 showing a front end 202 and a back end 204 of the machine. The machine symbol 200 can flip around on the display 120 and the seat symbol 206 can rotate on the display 120 to show the actual position of the seat relative to the machine. One of the indicator symbols 208, 210 can be lit to indicate to the operator the direction of propulsion.

Accordingly, indicator symbols 208, 210 indicate, relative to the seat symbol 206, and thus the actual operator's seat 110, the orientation of the operator and the direction of propulsion of the compactor machine 100 before it begins moving, allowing time to make adjustments, as needed.

In some examples, as discussed above, the sensor 116 (FIG. 1) coupled to the seat 110 can include a seat rotation position sensor to determine an exact angular orientation of the seat 110 relative to the machine 100. Thus, as shown in FIG. 3, if the seat is at a 45-degree angle, the seat symbol 206 can be shown rotated on the display 120 relative to the machine symbol 200, and the operator can still know, by the indicator symbols 208, 210, what the direction of propulsion is relative to the seat 110. Accordingly, the display 120 shows the seat symbol 206 and the machine symbol 200 and the indicator symbol 208, 210 to indicate an actual machine direction indication based on an actual seat angle. Thus, even if the seat is turned at a 45-degree angle, the indicator symbols 208, 210 will allow the operator to know which way the machine is headed relative to the seat orientation. Thus, this helps indicate the true propel direction with respect to operator orientation.

Accordingly, the present disclosure provides a compactor machine operation system where the controller 130 can determine a seat orientation of the operator's seat 110 relative to the front end 112 and the back end 114 of the compactor machine 100. And the controller 130 can be coupled to an indicator to indicate to the operator a direction of propulsion of the compactor machine 100 before the compactor machine begins moving.

In one example, the system can further perform a machine delay start. In one embodiment, the system includes a physical indicator light in the operator's line of sight indicating the direction of machine propulsion/steering.

INDUSTRIAL APPLICABILITY

The present system is applicable during many situations in road construction. For example, the present system can be used for soil compactors, asphalt compactors, pneumatic compactors, and the like.

Figure 4:
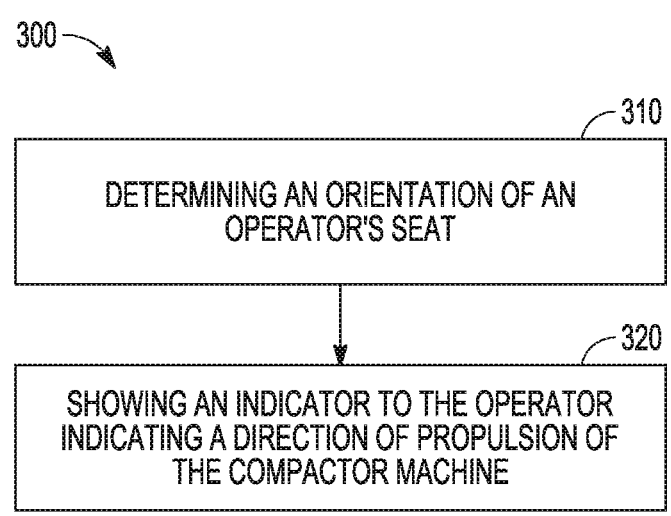
FIG. 4 shows a method for operating a compactor machine, in accordance with one embodiment.

FIG. 4 shows a method (300) for operating a compactor machine, in accordance with one embodiment. The method (300) can include determining an orientation (310) of an operator's seat 110 of the compactor machine 100; and showing an indicator (320) to the operator indicating a direction of propulsion of the compactor machine 100 before the compactor machine 100 begins moving.

As discussed above, in various examples, the indicator can include the first light 122 and the second light 124 attached to the front end 112 and the back end 114 of the compactor machine 100, respectively. The first light 122 and the second light 124 can be illuminated in various manners to indicate the direction of propulsion of the compactor machine 100.

In one example, the indicator can include the display 120 viewable by the operator, and an indicator symbol 208, 210 on the display 120 indicates to the operator the direction of propulsion of the compactor machine relative to the seat orientation.

The method (300) can further include delaying a start of the machine 100 while the indicator is indicating the direction of propulsion of the compactor machine.

The present system helps solve the problem of confusion that can arise when operating a symmetrical machine that can travel in either direction with a rotating seat and operator controls. There can also be a problem if the seat is rotated 90 degrees relative to the machine. The delay start and the indicator of the present system allow a user time to realize the direction of propulsion before the machine moves and make any needed adjustments.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A compactor machine comprising:
   a frame;
   one or more drums coupled to the frame;
   an operator's seat rotatable relative to the compactor machine; and
   a visual indicator to indicate to the operator a direction of propulsion and travel of the compactor machine before the compactor machine begins moving, wherein the visual indicator indicates the direction of propulsion and travel based on a current propel command direction before the propel command begins the machine moving;
   wherein the visual indicator includes a first light and a second light attached to a front end and a back end of the compactor machine, respectively, wherein a controller is configured to illuminate the first light and either turn off the second light or illuminate the second light in a color different than a color of the first light when the controller determines that the direction of propulsion is towards the front end of the compactor machine, and controller is configured to illuminate the second light and either turn off the first light or illuminate the first light in a color different than a color of the second light when the controller determines that the direction of propulsion is towards the back end of the compactor machine.

2. The compactor machine of claim 1, wherein the first light and the second light are positioned so as to be in an operator's line of sight.

3. The compactor machine of claim 1, wherein the indicator includes a display viewable by the operator and an indicator symbol on the display indicates to the operator the direction of propulsion of the compactor machine relative to an actual seat position.

4. The compactor machine of claim 3, wherein the display shows a seat symbol and a machine symbol and the indicator symbol indicates an actual machine direction indication based on an actual seat angle.

5. The compactor machine of claim 1, wherein the compactor machine includes a delay start before the compactor machine begins moving.

6. The compactor machine of claim 5, wherein the delay start is performed on a first propel anytime the operator's seat changes orientation, or when the operator first sits down, or when the operator buckles a seat belt.

7. The compactor machine of claim 1, wherein the visual indicator indicates to the operator the direction of propulsion and travel of the compactor machine before the compactor machine begins moving even if the seat is rotated to 90 degrees.

8. A system for operating a compactor machine comprising:
   a controller to determine a seat orientation of an operator's seat relative to a front end and a back end of the compactor machine; and
   a visual indicator coupled to the controller to indicate to the operator a direction of propulsion and travel of the compactor machine before the compactor machine begins moving, wherein the visual indicator indicates the direction of propulsion and travel based on a current propel command direction before the propel command begins the machine moving;
   wherein the visual indicator includes a first light and a second light attached to a front end and a back end of the compactor machine, respectively, wherein the controller is configured to illuminate the first light and either turn off the second light or illuminate the second light in a color different than a color of the first light when the controller determines that the direction of propulsion is towards the front end of the compactor machine, and controller is configured to illuminate the second light and either turn off the first light or illuminate the first light in a color different than a color of the second light when the controller determines that the direction of propulsion is towards the back end of the compactor machine.

9. The system of claim 8, wherein the first light and the second light are positioned so as to be in an operator's line of sight.

10. The system of claim 8, wherein the indicator includes a display viewable by the operator and an indicator symbol on the display indicates to the operator the direction of propulsion of the compactor machine relative to an actual seat position.

11. The system of claim 10, wherein display shows a seat symbol and a machine symbol and the indicator symbol indicates an actual machine direction indication based on an actual seat angle.

12. The system of claim 8, wherein the compactor machine includes a delay start before the compactor machine begins moving.

13. The system of claim 12, wherein the delay start is performed on a first propel after the operator's seat changes orientation, or when the operator first sits down, or when the operator buckles a seat belt.

14. The system of claim 8, wherein the visual indicator indicates to the operator the direction of propulsion and travel of the compactor machine before the compactor machine begins moving even if the seat is rotated to 90 degrees.

15. A method for operating a compactor machine comprising:
   determining an orientation of an operator's seat of the compactor machine; and
   showing an indicator to the operator visually indicating a direction of propulsion and travel of the compactor machine before the compactor machine begins moving, wherein the visual indicator indicates the direction of propulsion and travel based on a current propel command direction before the propel command begins the machine moving;
   wherein the visual indicator includes a first light and a second light attached to a front end and a back end of the compactor machine, respectively, wherein a controller is configured to illuminate the first light and either turn off the second light or illuminate the second light in a color different than a color of the first light when the controller determines that the direction of propulsion is towards the front end of the compactor machine, and controller is configured to illuminate the second light and either turn off the first light or illuminate the first light in a color different than a color of the second light when the controller determines that the direction of propulsion is towards the back end of the compactor machine.

16. The method of claim 15, wherein the first light and the second light are positioned so as to be in an operator's line of sight.

17. The method of claim 15, wherein the indicator includes a display viewable by the operator and an indicator symbol on the display indicates to the operator an actual machine direction indication based on an actual seat angle.

18. The method of claim 15, further including delaying a start of the machine while the indicator is indicating the direction of propulsion of the compactor machine.

\* \* \* \* \*